WILLIAM J. McLANE.
Improvement in Band Saw-Gangs.
No. 126,727. Patented May 14, 1872.

Witnesses:
A. Benneckendorf.
Geo. W. Mabee

Inventor:
W. J. McLane
per Munn & Co.
Attorneys.

UNITED STATES PATENT OFFICE.

WILLIAM J. McLANE, OF NEW YORK, N. Y., ASSIGNOR TO HIMSELF AND HENRY SILLIMAN, OF SAME PLACE.

IMPROVEMENT IN BAND-SAW GANGS.

Specification forming part of Letters Patent No. 126,727, dated May 14, 1872.

Specification describing a new and useful Improvement in Band-Saw Gangs, invented by WILLIAM J. McLANE, of the city, county, and State of New York.

This invention relates to a new and useful improvement in machinery for sawing lumber and marble; and consists in the construction and arrangement of parts hereinafter described.

Figure 1:
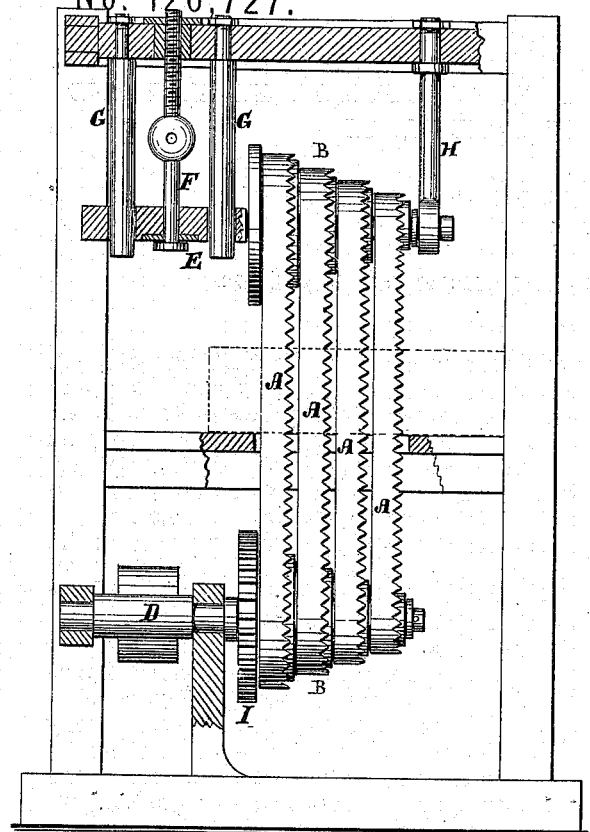
Figure 2:
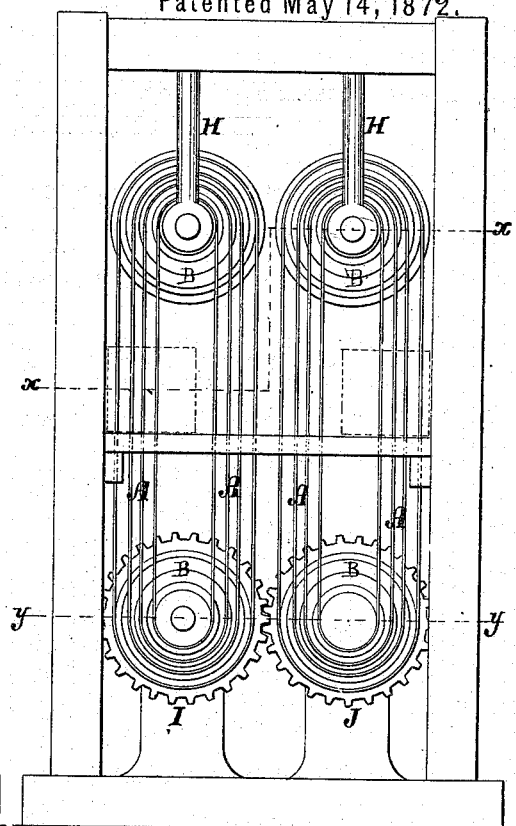
Figure 3:
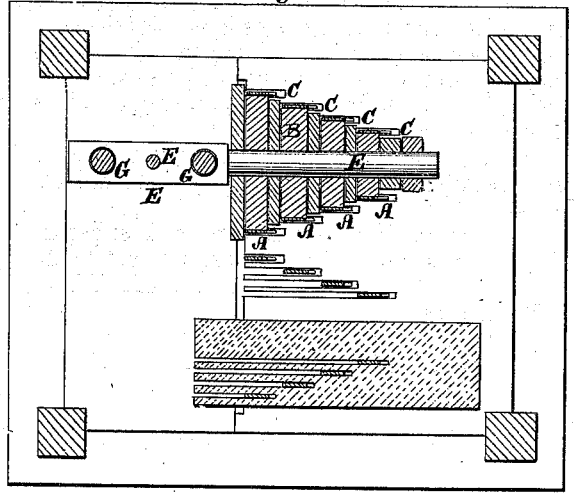
Figure 4:
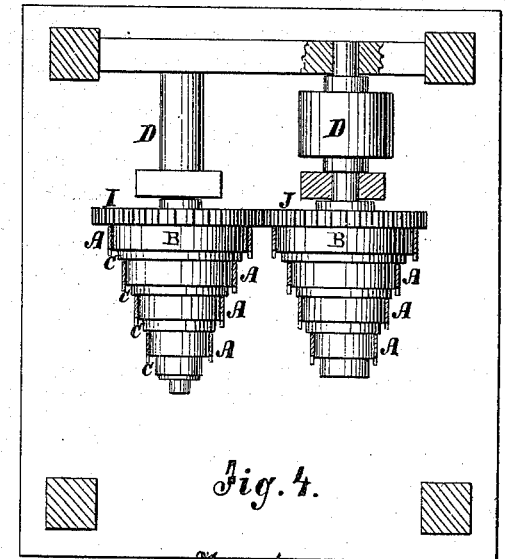

In the drawing, Figure 1 represents a sectional side elevation of a gang of saws arranged according to my invention. Fig. 2 is a front view of the same. Fig. 3 is a horizontal section of Fig. 2 taken on the line $x\,x$. Fig. 4 is a horizontal section taken on the line $y\,y$.

Similar letters of reference indicate corresponding parts.

A represents the saws; B, the pulleys. These pulleys are provided with recesses C, which allow the teeth of the saws to overhang the particular pulleys to which each saw is attached. This arrangement allows the plate of the saw to lie flat upon the pulley, and so that the set of the saw will not interfere. This arrangement of the saws is seen in Figs. 3 and 4. As seen in Fig. 1, D is the driving-shaft, and the pulleys are fast thereon, more or less in number, as may be desired. E is the shaft, on which are the upper pulleys. This is simply an arbor, on which the upper pulleys turn. The upper pulleys are separate. Each revolves by itself on the arbor.

In Fig. 1 the manner of straining the saws is seen, but I do not confine myself to any particular mechanism for that purpose. A turn-screw, as seen at F, may be used, or any other device. G G are guides to keep the arbor in proper position. The stay H may be dispensed with altogether, or it may be provided with a screw-shank with nuts above and below, so that it may be varied in height.

I am aware that band-saws are used at the present time. I do not, therefore, claim a band-saw, broadly, but I do claim a series of saws working in gauges, and also my mode of arranging them.

The gangs may be used either vertically, as seen in the drawing, or horizontally, or in an inclined position, as may be desired, and may be applied to sawing either wood or stone.

In the drawing pulleys are seen connected together by gear-wheels I and J; but the pulleys may be driven entirely by belts, or in any other suitable manner.

For the purpose of increasing the diameter of the loose or upper pulleys loose sleeves may be slipped on over the ordinary pulleys. This may be done when lumber is to be sawed to a particular bend, or when, from any cause, it is desired to enlarge the lower pulleys.

Having thus described my invention, I claim as new and desire to secure by Letters Patent—

A gang of band-saws, arranged substantially as described, for the purposes set forth.

WM. JAS. McLANE.

Witnesses:
T. B. MOSHER,
GEO. W. MABEE.